United States Patent
Hightower

(10) Patent No.: US 9,996,505 B2
(45) Date of Patent: Jun. 12, 2018

(54) MANAGING THE DISPLAY OF ELECTRONIC DOCUMENTS HAVING EMBEDDED GRAPHICAL ELEMENTS

(71) Applicant: Konica Minolta Laboratory U.S.A., Inc., San Mateo, CA (US)

(72) Inventor: Ron Hightower, Boulder, CO (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 232 days.

(21) Appl. No.: 14/841,663

(22) Filed: Aug. 31, 2015

(65) Prior Publication Data

US 2017/0060818 A1    Mar. 2, 2017

(51) Int. Cl.
| | |
|---|---|
| *G06F 17/00* | (2006.01) |
| *G06F 17/21* | (2006.01) |
| *G06F 3/0483* | (2013.01) |
| *G06F 3/0484* | (2013.01) |
| *G06F 3/0485* | (2013.01) |
| *G09G 5/34* | (2006.01) |

(52) U.S. Cl.
CPC .......... *G06F 17/212* (2013.01); *G06F 3/0483* (2013.01); *G06F 3/04842* (2013.01); *G06F 3/04855* (2013.01); *G09G 5/34* (2013.01); *G09G 2340/14* (2013.01)

(58) Field of Classification Search
CPC .................................................... G06F 3/0485
See application file for complete search history.

(56) References Cited

U.S. PATENT DOCUMENTS

| | | | |
|---|---|---|---|
| 8,086,951 B2 | 12/2011 | Kopp et al. | |
| 8,239,894 B2* | 8/2012 | Utsuki | H04N 5/44543 715/700 |
| 8,464,167 B2* | 6/2013 | Saund | H04L 51/04 715/758 |
| 8,671,359 B2* | 3/2014 | Koizumi | G06F 3/0485 345/213 |
| 8,958,109 B2 | 2/2015 | Natarajan | |
| 8,977,954 B2 | 3/2015 | Cho | |
| 2006/0277488 A1* | 12/2006 | Cok | G06F 3/04855 715/784 |
| 2011/0252302 A1* | 10/2011 | Yalovsky | G06F 17/30905 715/234 |
| 2014/0164987 A1* | 6/2014 | Kang | G06F 3/04883 715/784 |
| 2014/0181648 A1* | 6/2014 | Parsons | G06F 17/2247 715/273 |

* cited by examiner

*Primary Examiner* — Amelia Tapp
(74) *Attorney, Agent, or Firm* — Osha Liang LLP

(57) ABSTRACT

A method for managing a display of an electronic document (ED) on a display screen includes obtaining the ED specifying a plurality of text and a first graphical element; identifying a starting reference and an ending reference to the first graphical element within the plurality of text; displaying a portion of a segment of the plurality of text in a first region of the display screen, the segment being located between the starting reference and the ending reference; displaying, while displaying the portion of the segment, the first graphical element within a second region of the display screen, wherein the second region is adjacent to the first region on the display screen; removing the segment from the first region; and removing the first graphical element from the display screen in response to removing the segment such that the first region expands into the second region.

21 Claims, 7 Drawing Sheets

MANAGING THE DISPLAY OF ELECTRONIC DOCUMENTS HAVING EMBEDDED GRAPHICAL ELEMENTS

BACKGROUND

Electronic documents (EDs) having one or more graphical elements (e.g., images, clipart, animation sequences, etc.) are ubiquitous. Within each ED, there is frequently multiple text segments (e.g., words, sentences, paragraphs, etc.) that correspond to a graphical element. These text segments often describe the content or other properties of the graphical element to the reader of the ED.

An ED can be quite large, forcing the reader to scroll through the ED. The scrolling effect is achieved by sliding content, usually vertically, on a display screen in response to user manipulation of a scrollbar. However, as a result of the scrolling, the graphical element is no longer visible while one or more of the text segments corresponding to the graphical element are still visible and being viewed by the reader. This may cause the reader to pause reading, scroll the ED away from the current reading position to view the graphical element, and then scroll the ED to back to the reading position to resume reading. This is especially true when the display screen is small (e.g., screens on mobile devices). Regardless, users still wish to view these EDs and users still wish to view the EDs on mobile devices having small display screens.

SUMMARY

In general, in one aspect, the invention relates to a method for displaying an electronic document (ED) on a display screen. The method comprises obtaining the ED specifying a plurality of text and a first graphical element; identifying a starting reference and an ending reference to the first graphical element within the plurality of text; displaying a portion of a segment of the plurality of text in a first region of the display screen, the segment being located between the starting reference and the ending reference; displaying, while displaying the portion of the segment, the first graphical element within a second region of the display screen, wherein the second region is adjacent to the first region on the display screen; removing the segment from the first region; and removing the first graphical element from the display screen in response to removing the segment such that the first region expands into the second region.

In general, in one aspect, the invention relates to a non-transitory computer readable medium (CRM) storing computer readable program code embodied therein that: obtains an electronic document (ED) specifying a plurality of text and a first graphical element; identifies a starting reference and an ending reference to the first graphical element within the plurality of text; displays a portion of a segment of the plurality of text in a first region of a display screen, the segment being located between the starting reference and the ending reference; displays, while displaying the portion of the segment, the first graphical element within a second region of the display screen, wherein the second region is adjacent to the first region on the display screen; removes the segment from the first region; and removes the first graphical element from the display screen in response to removing the segment such that the first region expands into the second region.

In general, in one aspect, the invention relates to a system for displaying an electronic document (ED) on a display screen. The system comprises a buffer storing the specifying a plurality of text and a first graphical element; a position engine that identifies a starting reference and an ending reference to the first graphical element within the plurality of text; and a screen generator that: displays a portion of a segment of the plurality of text in a first region of the display screen, the segment being located between the starting reference and the ending reference; displays, while displaying the portion of the segment, the first graphical element within a second region of the display screen, wherein the second region is adjacent to the first region on the display screen; removes the segment from the first region; and removes the first graphical element from the display screen in response to removing the segment such that the first region expands into the second region.

Other aspects of the invention will be apparent from the following description and the appended claims.

DETAILED DESCRIPTION

Figure 1:
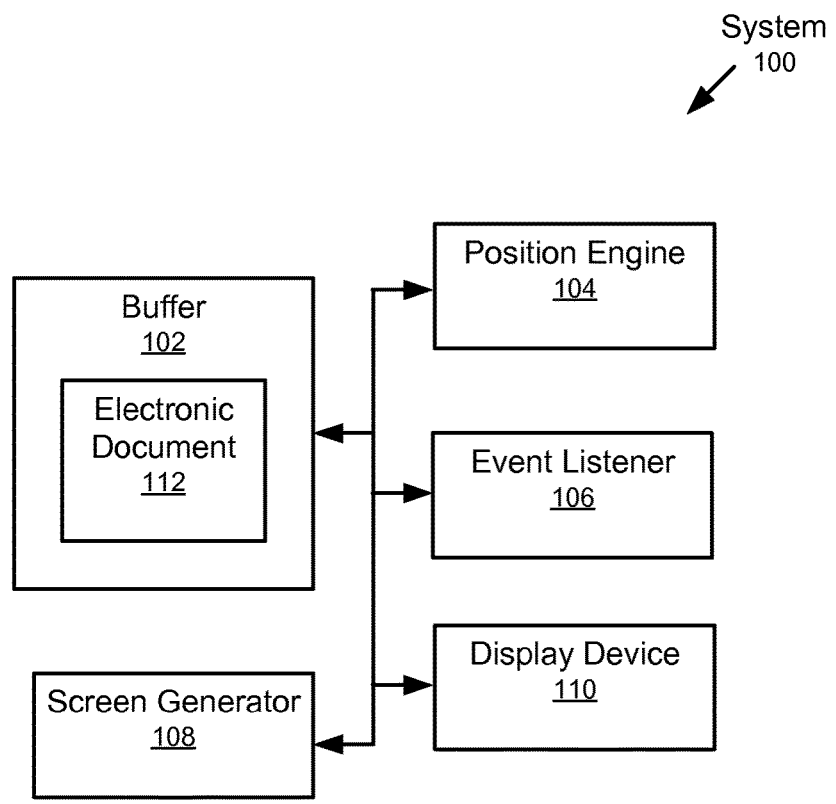
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for managing the display of an electronic document (ED) on a display screen. The ED may have one or more graphical elements (e.g., images, clipart, animation sequences, etc.) and one or more text segments corresponding to each graphical element. These text segments may be located between a starting reference and an ending reference, within the text of the ED, to the graphical element. The graphical element may be kept stationary (i.e., fixed) in a region of the display screen while the text segments can be independently manipulated (e.g., scrolled, scaled, etc.) by the user (i.e., reader) in a different region of the display screen. Partitioning of the display screen into the multiple regions and eventual removal of the region with the graphical element from the display screen may be triggered by scrollbar values and/or the page number of the page currently being displayed.

FIG. 1 shows a system (100) in accordance with one or more embodiments of the invention. As shown in FIG. 1, the system (100) has multiple components including, for example, a buffer (102), a position engine (104), an event listener (106), a screen generator (108), and a display screen (110). Each of these components (102, 104, 106, 108, 110) is discussed below. Moreover, each of the components may be located on the same hardware computing device (e.g., smart phone, tablet PC, laptop, e-reader, desktop personal computer (PC), kiosk, server, mainframe, cable box, etc.) or may be located on different hardware devices connected by a network of any size having wired and/or wireless segments.

In one or more embodiments of the invention, the system (100) includes the buffer (102). The buffer (102) may be of any size. The buffer (102) may be implemented in hardware (i.e., circuitry), software, or any combination thereof. The buffer (102) stores an electronic document (ED) (112) obtained/downloaded from any source including sources external to the system (100). The ED (112) may be a word processing document, a slide presentation, or any other type of file comprising text and one or more graphical elements. Further, the ED (112) may be in any format, including HTML, XML, OOXML, PDF, etc. The ED (112) may have recently been converted into its current format.

In one or more embodiments of the invention, the ED (112) may include a tag for each graphical element. The tag may include, as an attribute, a unique name or label for the graphical element (e.g., FIG. 1, FIG. 4.2, Drawing 3, Income Chart 7, elephant, etc.). This unique name or label (or a version of it) may appear in the text of the ED (112) to direct the reader's attention to the graphical element.

In one or more embodiments of the invention, the system (100) includes the position engine (104). The position engine (104) may be implemented in hardware (i.e., circuitry), software, or any combination thereof. The position engine (104) is configured to parse the text of the ED (112) to identify a starting reference and an ending reference, within the text, to the graphical element. The starting reference may correspond to the initial instance of the unique name or label for the graphical element within the text. Additionally or alternatively, the starting reference may correspond to the first word of the paragraph having the first instance of the unique name or label. In contrast, the ending reference may correspond to the final instance of the unique name or label for the graphical element within the text. Additionally or alternatively, the ending reference may correspond to the last word of the paragraph having the last instance of the unique name or label. In one or more embodiments of the invention, if a final instance does not exist, the last word of the paragraph having the sole instance is designated the ending reference. The text segments between the starting reference and the ending reference might or might not also have instances of the unique name or label for the graphical element.

In one or more embodiments of the invention, the position engine (104) is configured to calculate one or more reference positions for each graphical element. As discussed above, the ED (112) may be sufficiently large and the display screen (110) may be sufficiently small that a scrollbar is required by the reader to view (i.e., read) all the text of the ED (112). The reference positions are related to the starting and ending references. Some reference positions may correspond to scrollbar values when the ED (112) is displayed on the display screen (110). Some reference positions may correspond to page numbers of the pages being displayed. These reference positions may be added to the tag in the ED (112) for the graphical element. Additionally or alternatively, the reference positions may be added to any portion of the ED (112).

For example, one reference position may correspond to the scrollbar value when the starting reference just slides on to the display screen (110). As another example, one reference position may correspond to the scrollbar value when the ending reference just slides off the display screen (110). As another example, one reference position may correspond to the scrollbar value when the graphical element should start sliding off the display screen such that the graphical element is no longer visible when the ending reference position slides off the display screen. As another example, one reference position may correspond to the scrollbar value when the graphical element should start sliding onto the display screen such that the graphical element is fully visible when the starting reference position just slides on the display screen. As another example, reference positions may correspond to the scrollbar values when the starting reference and the ending reference are predetermined distances from the top of the display screen or region in which the text is displayed. As yet another example, one reference position may correspond to the page number of the page having the starting reference, the page having the ending reference, the page before the page with the starting reference, and the page after the page with the ending reference Those skilled in the art, having the benefit of this detailed description, will appreciate that this is not an exhaustive list of examples. One or more of the listed examples may be preferences set by the reader or the author of the ED (112).

In one or more embodiments of the invention, the system includes the event listener (106). The event listener (106) may be implemented in hardware (i.e., circuitry), software, or any combination thereof. The event listener (106) is configured to detect user manipulation of a scrollbar on the display screen (110) while the ED (112) is displayed. Further, the event listener (106) is configured to obtain the current scrollbar value and compare it with one or more of the reference positions for the graphical element(s) of the ED (112). Additionally or alternatively, the event listener (106) may detect a request to change the page being viewed (e.g., next page, previous page) and detect the page number of the new page being viewed. The event listener (106) may compare the page number of the new page being viewed with one or more of the reference positions for the graphical element(s) of the ED (112). Successful comparisons may be reported by the event listener to other components (e.g., screen generator (108)). The event listener (106) may also detect the selection, by the user/reader, of one or more tabs (discussed below) corresponding to the one or more graphical elements of the ED (112). In one or more embodiments of the invention, the system (100) includes the screen generator (108). The screen generator (108) may be implemented in hardware (i.e., circuitry), software, or any combination thereof. The screen generator (108) is configured to partition the display screen (110) into multiple regions that are displayed simultaneously. The regions may be different sizes. One region may be located above another region. For example, one region may display the graphical element while another region may display a portion (e.g., 1%, 15%, 72%, 100%, etc.) of one or more text segments corresponding to the graphical element. The screen generator (108) is also configured to slide regions (and their contents) off the display screen (110) and rearrange the remaining regions on the display screen (110). In one or more embodiment of the invention, each region is modified independently of the other regions. For example, the screen generator (108) may keep the graphical element stationary (i.e., fixed) in its region, while a scrolling effect is applied to the text segment(s) in the other region. Additionally or alternatively, the screen generator (108) may scroll the contents of both regions.

In one or more embodiments of the invention, actions taken by the screen generator (108) are triggered by scrollbar values, specifically when scrollbar values are compared with and match reference positions (discussed above). Additionally or alternatively, actions taken by the screen generator (108) may be triggered by the page number of the page being displayed, specifically when the page numbers are compared with and match reference positions (discussed above).

For example, comparisons between scrollbar values and reference positions may trigger the screen generator (108) to partition the display screen (110) into one or more regions. As another example, comparisons between scrollbar values and reference positions may trigger the sliding of the graphical element off the display screen. As another example, comparisons between scrollbar values and reference positions may trigger the sliding of the graphical element onto the display screen. As yet another example, comparisons between scrollbar values and reference positions may trigger the sliding of a region (and its contents) off the display screen. Those skilled in the art, having the benefit of this detailed description, will appreciate that this is not an exhaustive list of examples.

In one or more embodiments of the invention, the screen generator (108) is configured to display tabs. Like other actions taken by the screen generator (108), displaying tabs may be trigged by comparisons between the scrollbar values and reference positions. There may be one tab for each graphical element. In one or more embodiments of the invention, the screen generator is configured to display the graphical element in a region in response to user selection of the tab. The region may already exists prior to user selection of the tab. Additionally or alternatively, user selection of the tab may trigger the partitioning of the display screen into the one or more regions. The user may collapse a displayed graphical element back into a tab.

In view of the above, the screen generator (108) performs many actions. One or more of these actions may be performed according to instructions (e.g., code) in the ED (112). In other words, the obtained ED (112) may already include the instructions and the screen generator performs (e.g., executes, interprets, etc.) the instructions. The instructions may be inserted into the ED (112) by the author of the ED (112), the reader, and/or a third-party. The ED (112) with the instructions may be stored and/or distributed.

Although the system (100) in FIG. 1 is shown as having five components (102, 104, 106, 108, 110), those skilled in the art, having the benefit of this detailed description, will appreciate that one or more of the components may be duplicated, while two or more of the components may be collapsed into a single component. Further, the system (100) may have additional components that are not shown.

Figure 2:
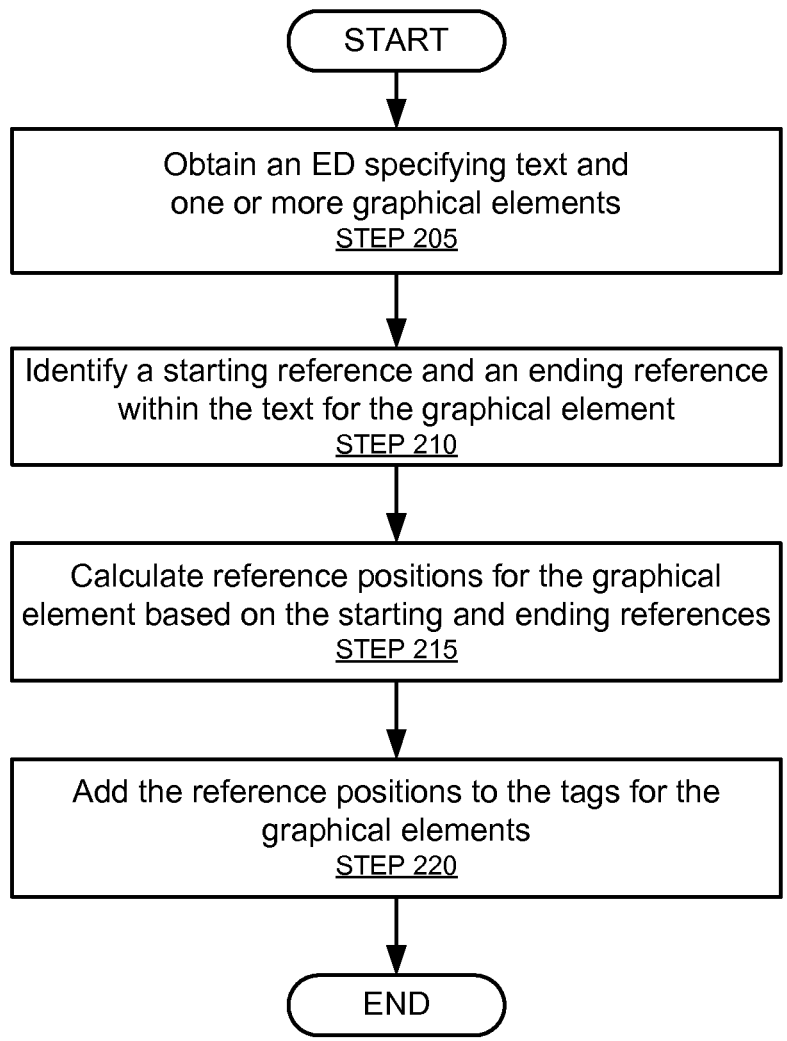
FIGS. 2 and 3 show flowcharts in accordance with one or more embodiments of the invention.

FIG. 2 shows a flowchart in accordance with one or more embodiments of the invention. The flowchart depicts a process for displaying an ED on a display screen. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an ED is obtained (STEP 205). The ED may be obtained (e.g., downloaded, retrieved, etc.) from any source. The ED may be in any format (e.g., HTML, OOXML, PDF, etc.). The ED specifies text and a (i.e., at least one) graphical element. The ED may include a tag for the graphical element. The tag may include, as an attribute, a unique name or label for each graphical element. This unique name or label (or a version of it) may appear in the text of the ED to direct the reader's attention to the graphical element.

In STEP 210, a starting reference and an ending reference for the graphical element are identifying within the text. The starting reference and the ending reference may be identified by parsing the text. The starting reference may correspond to the initial instance of the unique name or label for the graphical element within the text. Additionally or alternatively, the starting reference may correspond to the first word of the paragraph having the first instance of the unique name or label. In contrast, the ending reference may correspond to the final instance of the unique name or label for the graphical element within the text. Additionally or alternatively, the ending reference may correspond to the last word of the paragraph having the last instance of the unique name or label. In one or more embodiments of the invention, if a final instance does not exist, the last word of the paragraph having the sole instance is designated the ending reference. The text segments between the starting reference and the ending reference might or might not also have instances of the unique name or label for the graphical element.

In STEP 215, one or more reference positions for the graphical element are calculated based on the starting and ending references. The reference positions may correspond to various scrollbar values when the ED is displayed. The reference positions may correspond to the page numbers of the pages having the starting reference, the ending reference, etc. For example, one reference position may correspond to the scrollbar value when the initial reference just slides on to the display screen. As another example, one reference position may correspond to the scrollbar value when the final reference just slides off the display screen. As another example, reference positions may correspond to the scrollbar values when the starting reference and the final reference are predetermined distances from the top of the display screen or region in which the text is displayed. As another example, one reference position may correspond to the scrollbar value when the graphical element should start sliding off the display screen such that the graphical element is no longer visible when the ending reference position slides off the display screen. As another example, one reference position may correspond to the scrollbar value when the graphical element should start sliding onto the display screen such that the graphical element is fully visible when the starting reference position just slides on the display screen.

In STEP 220, these calculated reference values may be added to the tag in the ED for the graphical element. In one or more embodiments, STEP 220 is optional.

Those skilled in the art, having the benefit of this detailed description, will appreciate that STEP 210, STEP 215, and STEP 220 may be repeated for each graphical element in the ED.

Figure 3:
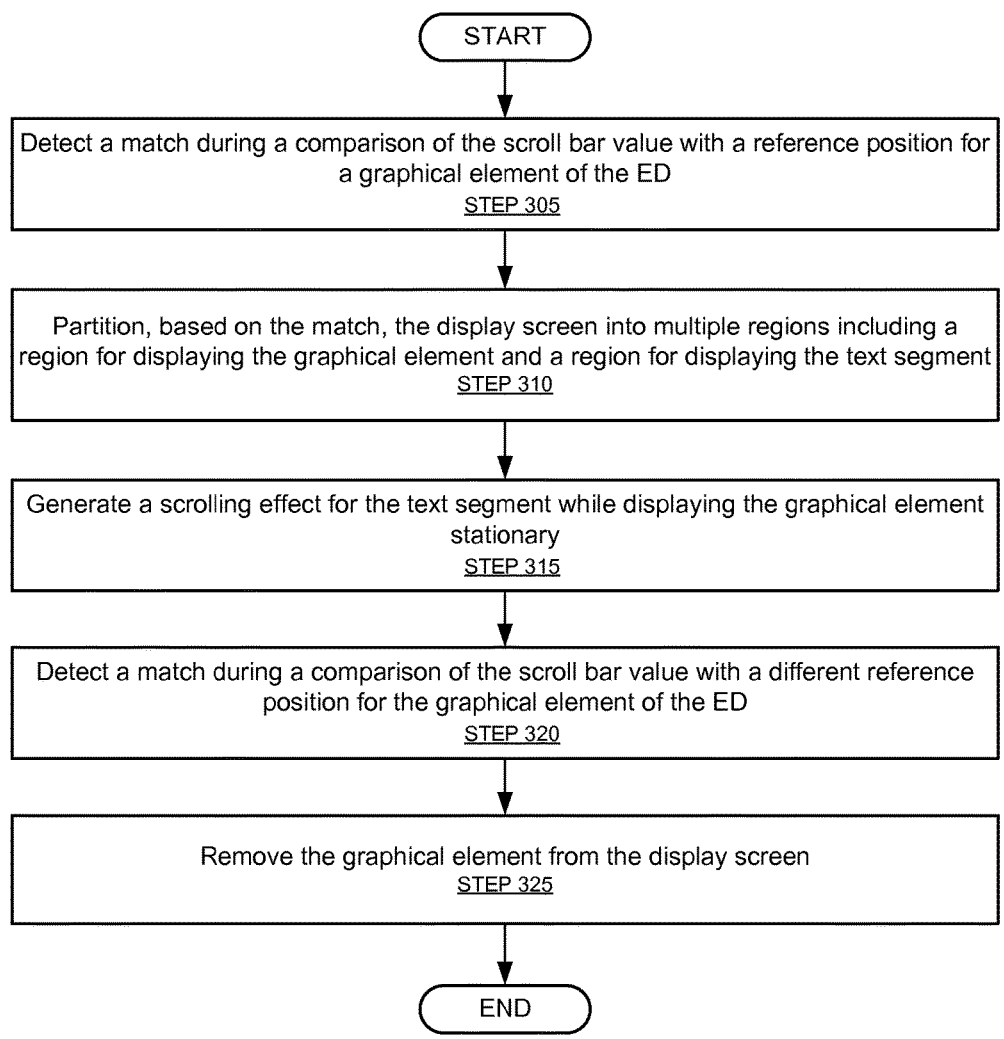

FIG. 3 shows a flowchart in accordance with one or more embodiments of the invention. The flowchart depicts a process for displaying an ED on a display screen. The process depicted in FIG. 3 may be executing during or after the process depicted in FIG. 2. One or more of the steps in FIG. 3 may be performed by the components of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, a match between a scrollbar value and a reference position for a graphical element of the ED is detected (STEP 305). STEP 305 may take place after the ED is displayed and the reader (i.e., user) has started manipulating the scrollbar. The reference position may be obtained from a tag in the ED for the graphical element. The reference position may correspond to a starting reference just appearing on the display screen or reaching some predetermined distance from the edge of the display screen or region in which the text is displayed.

In STEP 310, the display screen is partitioned into multiple regions in response to the match. One region may display the graphical element while another region may display a portion (e.g., 1%, 25%, 84%, 100%, etc.) of one or more text segments for the graphical element. As discussed above, each text segment is a portion of the ED's text located between the starting reference and the ending reference for the graphical element. The region with the graphical element may be placed above the region with the text segment on the display screen. Additionally or alternatively, the region with the graphical element may be placed beside the region with the text segment on the display screen. Different regions may be different sizes. For example, the region for displaying the graphical element may be slightly larger than the graphical image itself, while the region for displaying the text segment may be 3× larger than the region for displaying the graphical element.

In STEP 315, a scrolling effect is generated for the text segment by sliding the text segment across its region (i.e., the region of the display screen for displaying the text segment). This scrolling effect is in response to the reader's (i.e., user's) manipulation of the scrollbar. While the scrolling effect is being generated, the graphical element is displayed fixed (i.e., stationary) in its region. This allows the reader to keep the graphical element displayed on the display device while one or more text segments regarding the graphical element are scrolled within another region. Further, as the text segments and the graphical element are in different regions, each can be manipulated independently of the other. For example, the user can scale graphical element without scaling the text segment.

In STEP 320, a match between a scrollbar value and a different reference position for the graphical element of the ED is detected. The reference position may be obtained from a tag in the ED for the graphical element. The reference position may correspond to an ending reference for the graphical element just leaving the display screen or reaching some predetermined distance from the edge of the display screen or region in which the text is displayed.

In STEP 325, the graphical element is removed from the display screen based on the match of STEP 320. The removal may be executed by removing the graphical element from the region in which it is displayed. Additionally or alternatively, the removal may be executed by sliding the region having the graphical element off the display screen (i.e., effectively scrolling the graphical element in parallel with the text). If the region with the graphical element is above the region with the text segment, during the removal, the region with the text segment may be relocated or enlarged to fill any void on the display screen left by sliding the region with the graphical element off the screen.

Although the process shown in FIG. 3 only discusses a single graphical element, those skilled in the art, having the benefit of this detailed description, will appreciate that a text segment may reference multiple graphical elements. Accordingly, the display screen may be partitioned into multiple regions, with each region simultaneously displaying one of the multiple graphical elements. Additionally or alternatively, when a text segment corresponds to multiple graphical elements, only one graphical element (or a subset of the graphical elements) is displayed at a time. One or more tabs may also be displayed (e.g., one tab per graphical element) allowing the user to select which graphical element to be displayed.

Although the process in FIG. 3 focuses on scrollbar values to trigger actions, in other embodiments and as discussed above, the page number of the current page being displayed acts as a trigger for one or more actions.

Figure 4A:
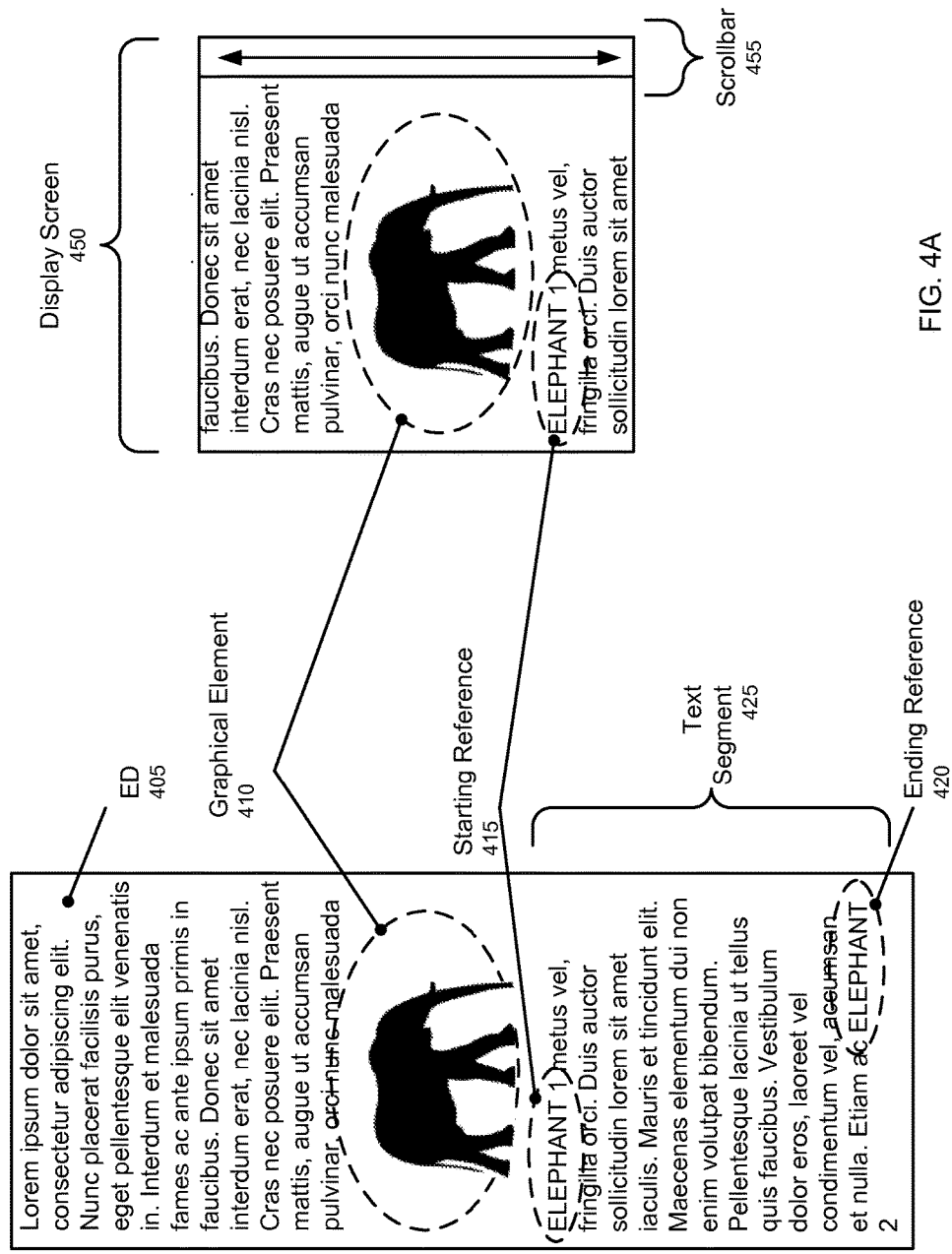
FIGS. 4A, 4B, and 4C show examples in accordance with one or more embodiments of the invention.
Figure 4B:
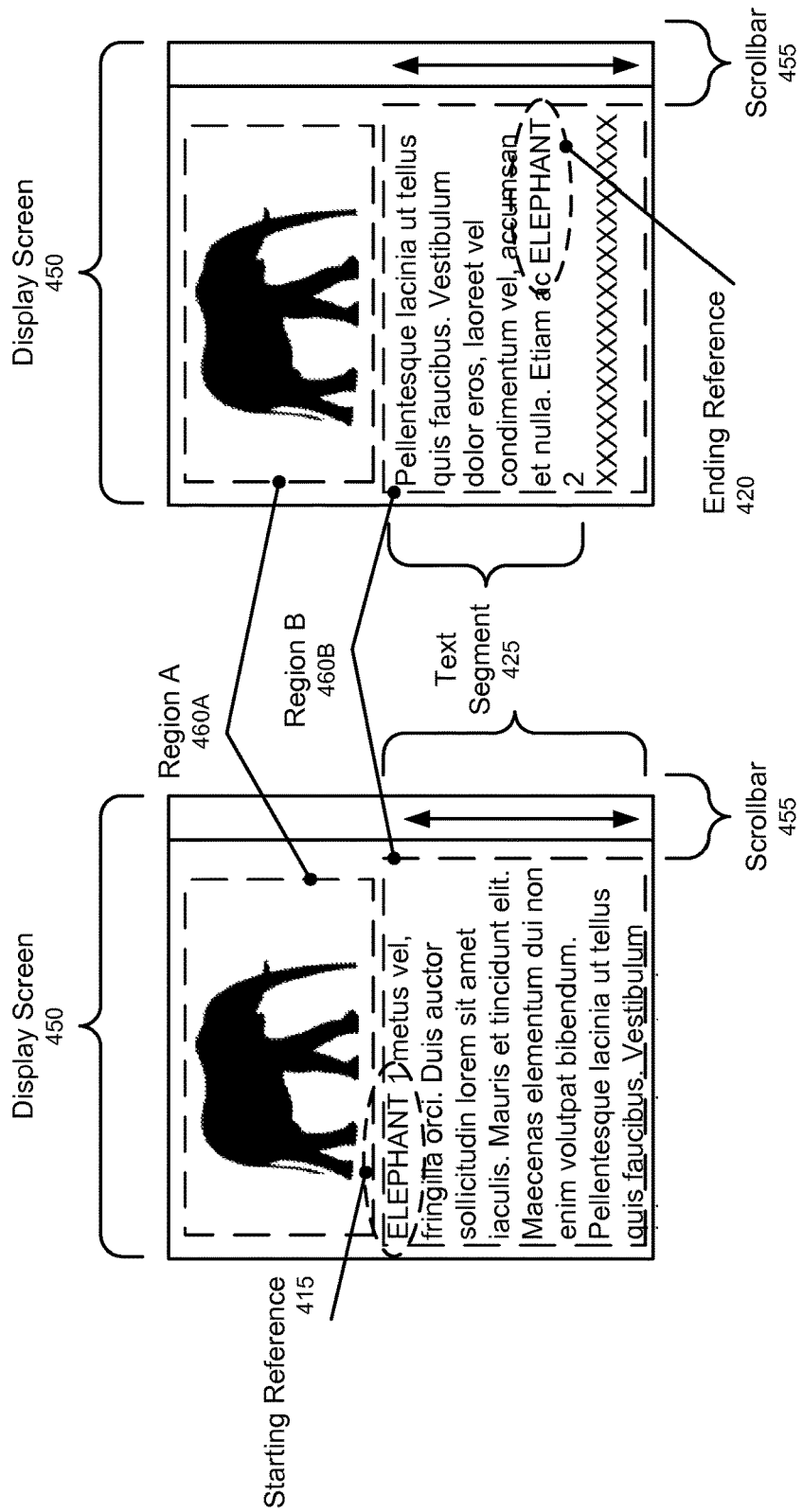
Figure 4C:
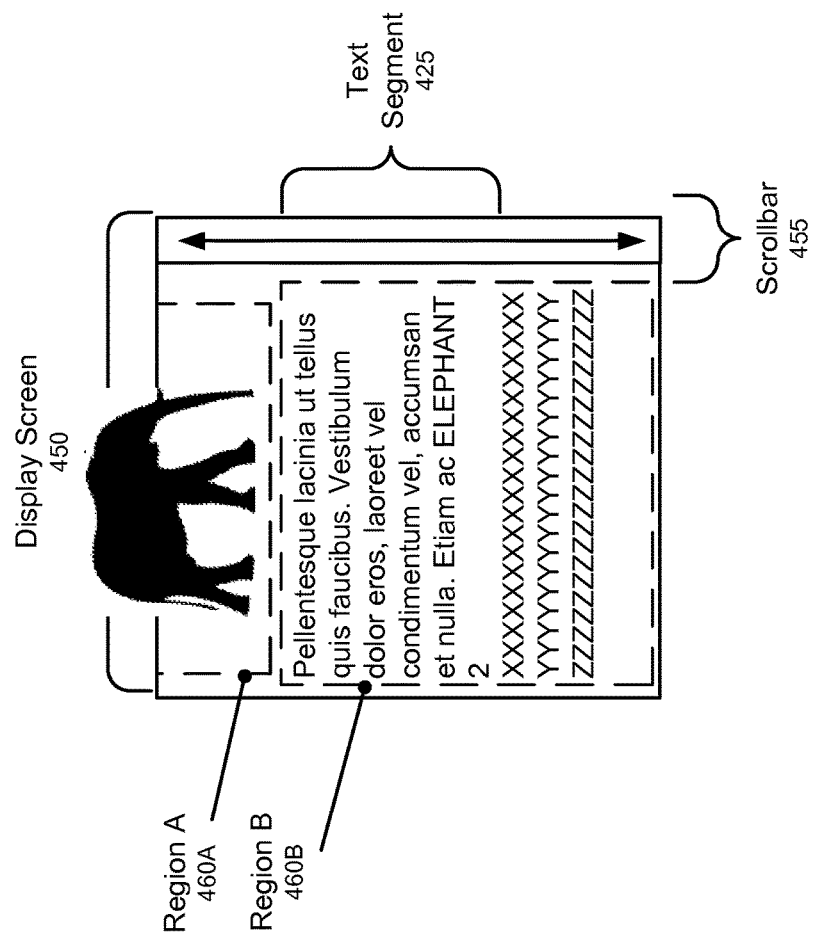

FIGS. 4A-4C show an example in accordance with one or more embodiments of the invention. As shown in FIG. 4A, an ED (405) has a graphical element (410). The ED (405) is much too large to fit within the display screen (450) of a smart phone. Accordingly, it is necessary for the reader to use a scrollbar (455) to scroll through the ED (405) displayed on the display screen (450).

By parsing the text of the ED (405), a starting reference (415) and an ending reference (420) may be identified for the graphical element (410). The text between the starting reference and the ending reference is a segment (425) of the total text in the ED (405).

Various reference positions have been calculated for the graphical element. As discussed above, the reference positions correspond to scrollbar values and are associated with the graphical element (410), the starting reference (415), and/or the ending reference (420). As also discussed above, when the scrollbar value equals one of the reference positions, this may trigger one or more actions to take place.

In FIG. 4B, the display screen (450) is partitioned into two regions: Region A (460A) and Region B (460B). The partitioning was triggered by the scrollbar value equaling one of the reference positions. The graphical element (410) is displayed in region A (460A) while the text segment (425) is displayed in region B (460B). The reader (i.e., user) is able to scroll the text segment (425) while the graphical element (410) remains fixed in region A (460A). As a result, the graphical element (410) remains visible to the reader (i.e., user) when the starting reference (415) is visible on the display screen (450), and when the ending reference (420) is visible on the display screen (450).

In FIG. 4C, as the reader continues to scroll the text segment (425), region A (460A) starts to slide off the display screen (450). In other words, from the user's perspective, both the graphical element (410) and the text segment (425) are scrolling. The sliding of region B (460B) is also triggered by the scrollbar value equaling one or more of the reference positions. As region A (460A) scrolls off the display screen, region B (460B) is relocated (i.e., moved upwards) to fill any void created by the sliding of region A (460). The first region effectively expands into the second region.

One or more embodiments of the invention may have the following advantages: the ability to keep the display of a graphical element stationary while generating a scrolling effect for a text segment corresponding to the graphical element; the ability to use scrollbar values to trigger actions including the partitioning of a display screen; the ability to identify starting segments and ending segments for a graphical element within the text of the ED; the ability to add reference positions to the tag of a graphical element in the ED; etc.

Figure 5:
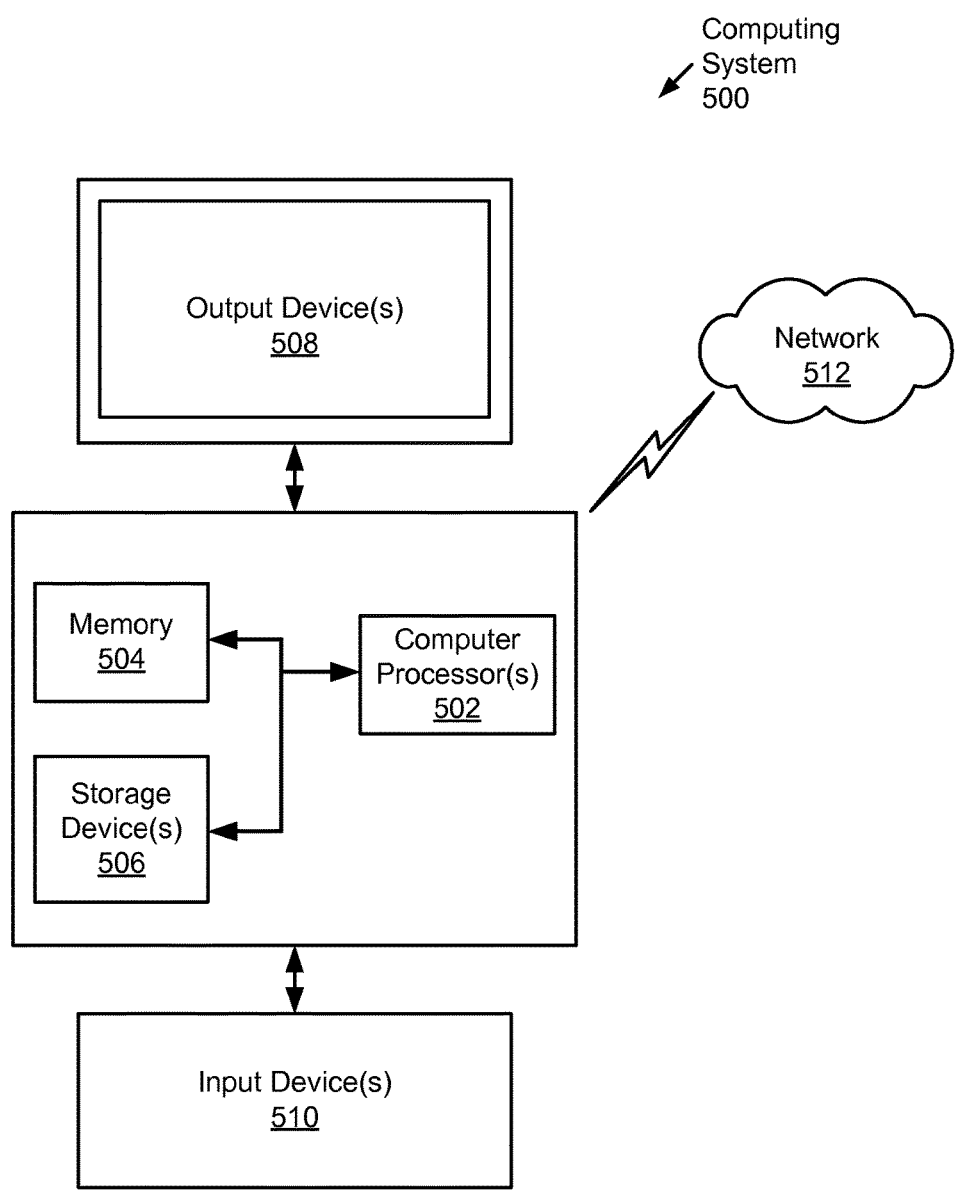
FIG. 5 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a display of an electronic document (ED) on a display screen, comprising:
   obtaining the ED specifying a plurality of text, a first graphical element, and a tag for the first graphical element comprising a label for the first graphical element;
   identifying a starting reference and an ending reference to the first graphical element by parsing the plurality of text in search of the label within the plurality of text;
   displaying a portion of a segment of the plurality of text in a first region of the display screen, the segment being located between the starting reference and the ending reference;
   displaying, while displaying the portion of the segment, the first graphical element within a second region of the display screen, wherein
      the second region is adjacent to the first region on the display screen, and
      the first graphical element is displayed and remains stationary in the second region in response to scrolling the starting reference to the graphical element into the first region of the display screen;
   removing the segment from the first region; and
   removing the first graphical element from the display screen in response to removing the segment such that the first region expands into the second region.

2. The method of claim 1, further comprising:
   generating a scrolling effect by sliding the portion of the segment across the first region, wherein the first graphical element remains stationary in the second region during the scrolling effect.

3. The method of claim 2, further comprising:
   sliding the starting reference and the first graphical element onto the display screen; and
   partitioning the display screen into the first region comprising the starting reference and the second region comprising the first graphical element, wherein removing the first graphical element from the display screen comprises sliding the first graphical element off the display screen.

4. The method of claim 3, further comprising:
   obtaining a first reference position and a second reference position associated with the first graphical element;
   generating a first comparison between the first reference position and a first scrollbar value associated with a scrollbar displayed on the display screen, wherein partitioning the display screen is based on the first comparison; and
   generating a second comparison between the second reference position and a second scrollbar value, wherein sliding the first graphical element off the display screen is based on the second comparison.

5. The method of claim 1, further comprising:
   obtaining a reference position associated with the first graphical element;
   generating a comparison between the reference position and a page number of a page displayed on the display screen;
   partitioning the display screen into the first region and the second region in response to the comparison.

6. The method of claim 1, wherein the second region is displayed above the first region on the display screen.

7. The method of claim 1, further comprising:
   sliding the starting reference to the first graphical element onto the display screen;
   displaying a first tab associated with the first graphical element onto the display screen;

sliding a starting reference to a second graphical element in the ED onto the display screen; displaying a second tab associated with the second graphical element; receiving a selection of the first tab; and partitioning, in response to the selection of the first tab, the display screen into the first region comprising the portion of the segment and the second region comprising the first graphical element.

8. The method of claim 1, wherein:
the first graphical element is one selected from a group consisting of an image, clipart, and an animation sequence;
the starting reference is a starting word of a first paragraph comprising the label for the first graphical element; and
the ending reference is an ending word of a second paragraph comprising the label for the first graphical element.

9. A non-transitory computer readable medium (CRM) storing computer readable program code embodied therein that:
obtains an electronic document (ED) specifying a plurality of text, a first graphical element, and a tag for the first graphical element comprising a label for the first graphical element;
identifies a starting reference and an ending reference to the first graphical element by parsing the plurality of text in search of the label within the plurality of text;
displays a portion of a segment of the plurality of text in a first region of a display screen, the segment being located between the starting reference and the ending reference;
displays, while displaying the portion of the segment, the first graphical element within a second region of the display screen, wherein the second region is adjacent to the first region on the display screen, and
the first graphical element is displayed and remains stationary in the second region in response to scrolling the starting reference to the graphical element into the first region of the display screen;
removes the segment from the first region; and
removes the first graphical element from the display screen in response to removing the segment such that the first region expands into the second region.

10. The non-transitory CRM of claim 9, further comprising program code embodied therein that:
generates a scrolling effect by sliding the portion of the segment across the first region, wherein the first graphical element remains stationary in the second region during the scrolling effect.

11. The non-transitory CRM of claim 10, further comprising program code embodied therein that:
slides the starting reference and the first graphical element onto the display screen; and
partitions the display screen into the first region comprising the starting reference and the second region comprising the first graphical element,
wherein removing the first graphical element from the display screen comprises sliding the first graphical element off the display screen.

12. The non-transitory CRM of claim 11, further comprising program code embodied therein that:
obtains a first reference position and a second reference position associated with the first graphical element;
generates a first comparison between the first reference position and a first scrollbar value associated with a scrollbar displayed on the display screen, wherein partitioning the display screen is based on the first comparison; and
generates a second comparison between the second reference position and a second scrollbar value, wherein sliding the first graphical element off the display screen is based on the second comparison.

13. The non-transitory CRM of claim 9, further comprising program code embodied therein that:
obtains a reference position associated with the first graphical element;
generates a comparison between the reference position and a page number of a page displayed on the display screen;
partitions the display screen into the first region and the second region in response to the comparison.

14. The non-transitory CRM of claim 9, further comprising program code embodied therein that:
slides the starting reference to the first graphical element onto the display screen;
displays a first tab associated with the first graphical element onto the display screen; slides a starting reference to a second graphical element in the ED onto the display screen; displays a second tab associated with the second graphical element; receives a selection of the first tab; and
partitions, in response to the selection of the first tab, the display screen into the first region comprising the portion of the segment and the second region comprising the first graphical element.

15. A system for managing a display of an electronic document (ED) on a display screen, comprising:
a memory storing the ED specifying a plurality of text, a first graphical element, and a tag for the first graphical element comprising a label for the first graphical element;
a computer processor connected to the memory that:
identifies a starting reference and an ending reference to the first graphical element by parsing the plurality of text in search of the label within the plurality of text;
displays a portion of a segment of the plurality of text in a first region of the display screen, the segment being located between the starting reference and the ending reference;
displays, while displaying the portion of the segment, the first graphical element within a second region of the display screen, wherein the second region is adjacent to the first region on the display screen, and
the first graphical element is displayed and remains stationary in the second region in response to scrolling the starting reference to the graphical element into the first region of the display screen;
removes the segment from the first region; and
removes the first graphical element from the display screen in response to removing the segment such that the first region expands into the second region.

16. The system of claim 15, wherein the computer processor also:
generates a scrolling effect by sliding the portion of the segment across the first region, wherein the first graphical element remains stationary in the second region during the scrolling effect.

17. The system of claim 16, wherein the computer processor also:

slides the starting reference and the first graphical element onto the display screen; and partitions the display screen into the first region comprising the starting reference and the second region comprising the first graphical element, wherein removing the first graphical element from the display screen comprises sliding the first graphical element off the display screen.

18. The system of claim 17, wherein the computer processor also:

obtains a first scrollbar value and a second scrollbar value associated with a scrollbar displayed on the display screen;

generates a first comparison between the first scrollbar value and a first reference position associated with the first graphical element, wherein partitioning the display screen is based on the first comparison; and generates a second comparison between the second scrollbar value and a second reference position associated with the first graphical element, wherein sliding the first graphical element off the display screen is based on the second comparison.

19. The system of claim 15, wherein the computer processor also:

slides the starting reference to the first graphical element onto the display screen;

displays a first tab associated with the first graphical element onto the display screen;

slides a starting reference to a second graphical element in the ED onto the display screen;

displays a second tab associated with the second graphical element; and partitions, in response to a selection of the first tab, the display screen into the first region comprising the first portion of the segment and the second region comprising the first graphical element.

20. The system of claim 15, wherein the computer processor also:

obtains a reference position associated with the first graphical element;

generates a comparison between the reference position and a page number of a page displayed on the display screen;

partitions the display screen into the first region and the second region in response to the comparison.

21. The system of claim 15, wherein:

the first graphical element is one selected from a group consisting of an image, clipart, and an animation sequence;

the starting reference is a starting word of a first paragraph comprising the label for the first graphical element; and the ending reference is an ending word of a second paragraph comprising the label for the first graphical element.

* * * * *